United States Patent [19]
DeSpain

[11] Patent Number: 4,933,770
[45] Date of Patent: Jun. 12, 1990

[54] RADIO FAX TRANSMISSION
[76] Inventor: George H. DeSpain, 2301 Lord Baranof, Anchorage, Ak. 99517
[21] Appl. No.: 155,475
[22] Filed: Feb. 12, 1988
[51] Int. Cl.⁵ .............................................. H04N 1/32
[52] U.S. Cl. ................................... 358/434; 358/400; 370/24; 330/69; 379/100; 455/78
[58] Field of Search ................... 379/100; 455/78; 358/294, 295, 257, 256; 370/24, 27; 330/69

[56] References Cited
U.S. PATENT DOCUMENTS

| | | | |
|---|---|---|---|
| 2,599,904 | 6/1952 | Evans | 358/257 |
| 3,479,451 | 11/1969 | Regunberg et al. | 358/257 |
| 3,641,432 | 2/1972 | Bond | 358/256 |
| 4,055,729 | 10/1977 | Vandling | 379/100 |
| 4,809,297 | 2/1989 | Polmsky et al. | 375/7 |

Primary Examiner—Douglas W. Olms
Assistant Examiner—J. Bocure
Attorney, Agent, or Firm—Ernest M. Anderson

[57] ABSTRACT

Disclosed is an audio-to-radio and radio-to-audio signal converter and method for interfacing a facsimile machine with a radio transmitter-receiver having a microphone input, an audio output and a push-to-talk relay. The converter provides a first circuit for inputting the output signal of a facsimile machine to the microphone input of a radio transmitter-receiver; a second circuit controlled by the output signal of the facsimile machine for operating the push-to-talk relay of the radio transmitter-receiver; and a third circuit connected to the audio output of the transmitter-receiver for amplifying the audio output signal, and inputting the resultant signal to the facsimile machine. A fourth circuit provides a null feedback that keeps the stronger audio signals from being amplified which may trigger the push-to-talk relay.

6 Claims, 2 Drawing Sheets

RADIO FAX TRANSMISSION

BACKGROUND OF THE INVENTION

This invention relates generally to facsimile transmissions of information visually displayed on a medium such as paper, and more specifically to the transmission of facsimile copies by interfacing standard facsimile units with high frequency single sideband radios. Standard facsimile machines (FAX) are now widely used to transmit copies of printed and pictorial information over telephone lines. The usual practice is to couple a FAX to a dedicated telephone line that provides two-way communication to all other FAXs which are likewise coupled through their own dedicated telephone lines. Other FAX systems are in use which transmit information over radio frequencies. However, all such systems known to applicant use duplex operation (one frequency is used for sending and another frequency for receiving).

SUMMARY OF THE INVENTION

One object of this invention is to provide a converter for coupling a FAX to a radio transmitter-receiver to permit communication and the transmission of FAX-copied information between two FAX machines via a single side band radio signal.

Broadly summarized, the invention provides an audio-to-radio and radio-to-audio signal converter and method for interfacing a FAX machine with a radio transmitter-receiver having a microphone input, an audio output and a push-to-talk relay. The converter essentially comprises:

(a) first circuit means for inputting the output signal of a facsimile machine to the microphone input of a radio transmitter-receiver, (b) second circuit means connected to and controlled by the output signal of a facsimile machine for operating the push-to-talk relay of a radio transmitter-receiver, and (c) third circuit means connected to the audio output of the radio transmitter-receiver for transmitting a message carrying signal to a facsimile machine.

Other objects and features of the invention will become apparent in view of the following detailed description and the accompanying drawings.

BRIEF DESCRIPTION OF THE DRAWINGS

In the drawings forming a part of this application and in which like parts are identified by like reference numbers.

DETAILED DESCRIPTION OF THE PREFERRED EMBODIMENTS

Figure 1:
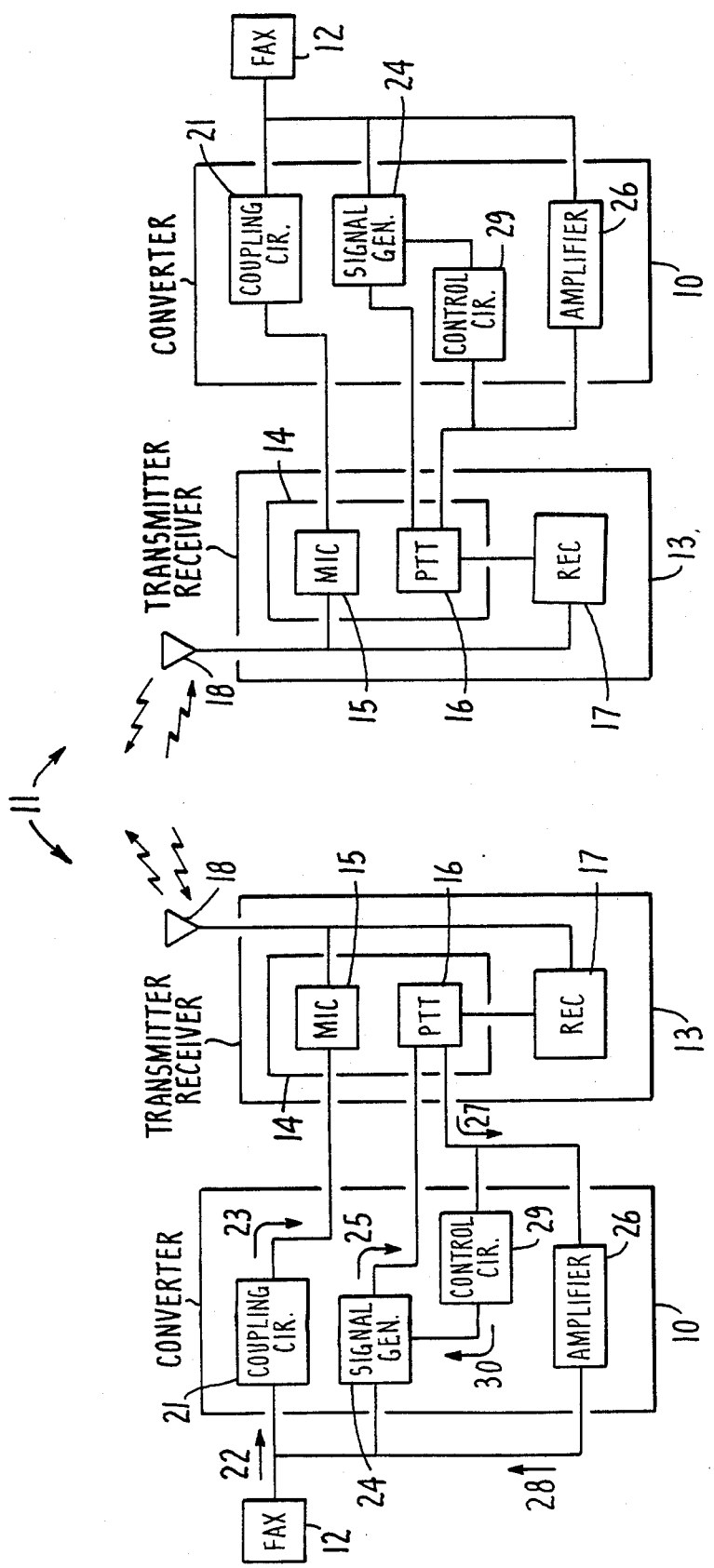
FIG. 1 is a schematic drawing illustrating in block diagram one embodiment of the invention including a pair of converters coupled into a fax-radio transmission system comprising two facsimile machines and two high frequency single side band (SSB) radios.

FIG. 1 shows an overview of the invention and the placement and operation of a pair of converters 10 coupled into a fax-radio communication network 11. The audio-to-radio and radio-to-audio converters 10 interface a pair of FAX machines 12 with a pair of conventional transmitter-receivers 13, each having a transmitter circuit 14 including a microphone input 15, a push-to-talk relay (PTT) 16, a receiver circuit 17 having an audio output, and an antenna 18. Although relay 16 is operated by a push button for normal radio transmission, an electronic switch is provided as part of converter 10 to operate the relay for FAX transmissions. The operation of relay 16 in conjunction with the electronic switch is described herein following a description of converters 10.

Each converter 10 essentially comprises a first circuit means. 21 that receives the output signal 22 of a FAX machine, produces a resultant signal 23 which is connected to the microphone input 15. A second circuit means 24 receives the FAX output signal 22 and produces a control signal 25 to close an electrical switch, operate the push-to-talk relay 16 and open the relay contacts in the audio output of receiver 17. A third circuit means 26 is adapted to receive the audio output signal 27 from receiver circuit 17 through the normally closed contacts of relay 16 and produce a corresponding message signal 28. Assuming the contacts of relay 16 are closed and a radio signal is received in receiver circuit 17, an audio output signal 27 is sent to the third circuit means which amplifies the audio input and produces message signal 28. Converter 10 also provides a fourth circuit means 29 which produces a nulling signal 30 to the second circuit means 24 upon receipt of an audio input signal 27. The purpose of providing a null is to keep the incoming audio signal 27 from being amplified and false keying the push-to-talk circuit of transmitter receivers 13.

Figure 2:
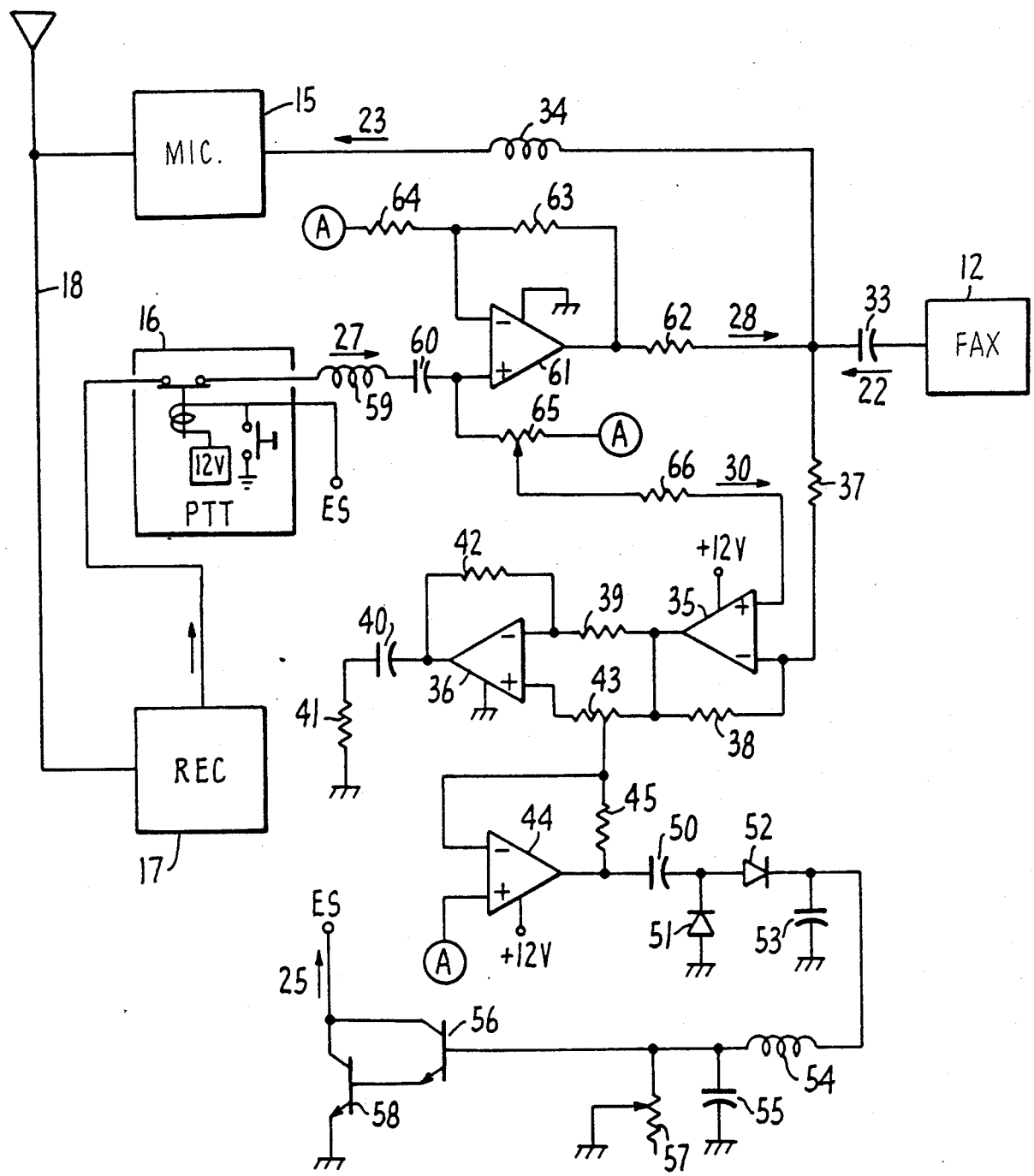
FIG. 2 is a circuit diagram illustrating a detailed construction of a preferred converter circuit.

FIG. 2 illustrates one embodiment of converter 10 that provides each of the circuit means and functions described above. More particularly, first circuit means 21 connects the output of a FAX machine 12 with the microphone input 15 of after circuit 14 through a capacitor 33 and a radio frequency choke 34.

Second circuit means 24 comprises a pair of operational amplifiers 35 and 36, the inverting input (−) of amplifier 35 being connected to capacitor 33 through a resistance 37. The inverting input also connects to a feedback loop from the amplifier's output through a resistor 38; and the amplifier is powered by a (+) 12 volt d.c. supply.

The output of amplifier 35 connects to the inverting input (−) of amplifier 36 through a resistance 39, the output of amplifier 36 being connected to ground through a capacitor 40 and a resistance 41; and a feedback loop containing a resistance 42 connects the output to the inverting input (−). The output of amplifier 35 is also coupled to the non-inverting (+) input of amplifier 36 through a variable resistor 43. Signal 24 is obtained from the wiper or movable contact of variable resistor 43 and, as explained below, is used to control an electronic switch for operating relay 15.

Figure 3:
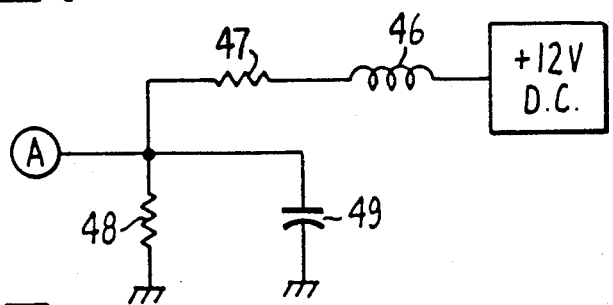
FIG. 3 illustrates a power circuit used with the converter circuitry of FIG. 2.

Second circuit means 24 further comprises an operational amplifier 44 having its inverting input (−) connected to the tap of variable resistor 43. The amplifier is coupled to a (+) 12 volt d.c. supply, and the non-inverting (+) input connects to a power source (shown as A) which is developed as shown in FIG. 3. This power source is used in other circuits of the converter and is formed with a (+) 12 volt d.c. supply connected to ground through an RF choke 46, a resistance 47 and a pair of leg connections to ground, one leg having a resistance 48 and the other a capacitor 49.

Second circuit means 24 also provides means for rectifying the output from amplifier 44. That output connects to a rectifier circuit consisting of a capacitor 50 coupled through a grounded diode 51, a diode 52, a grounded capacitor 53, an RF choke 54 and a grounded capacitor 55. The anode of capacitor 55 connects to the base of a transistor switch 56 and the base is grounded through a variable resistor 57. The emitter of switch 56 connects to the base of a second transistor 58 having its emitter connected to ground. The collectors of both transistors 56 and 58 connect to the push-to-talk relay 16 as described above. Thus, when transistor switches 56 and 58 are conductive, a current flows through the coil of relay 16, opening the relay contacts in the audio output of receiver circuit 17.

Third circuit means 26 couples FAX 12 to receiver 17 through the relay contacts of push-to-talk relay 16 as shown. More particularly, the audio output signal is fed through an RF choke 59 and a capacitor 60 to the non-inverting input of an operational amplifier 61; and the output of amplifier 61 connects to FAX 12 through capacitor 33 and a resistance 62. A feedback loop connects the inverting (−) input of amplifier 61 to its output through a resistor 63. The inverting input is also connected through a resistor 64 to power source A.

Fourth circuit means 29 connects the non-inverting input of amplifier 61 with power source A through a variable resistor 65; the wiper or movable contact of variable resistor 65 is connected through a resistor 66 to the non-inverting (+) input of amplifier 35.

The following table contains a further identification and exemplary values of each of the devices incorporated in the converter circuitry shown in FIG. 2:

| | |
|---|---|
| amplifers 35, 36, 44 and 61 = | 1458 op amp. |
| diodes 51, 52 = | 1N 4148 |
| transistors 56, 58 = | 2N 4124 |
| resistors (in ohms) | |
| 37-220K | |
| 38-100K | |
| 39-47K | |
| 41-47K | |
| 42-10K | |
| 43-100K | |
| 45-220K | |
| 47-10K | |
| 48-10K | |
| 57-10K | |
| 62-10K | |
| 63-33K | |
| 64-15K | |
| 65-100K | |
| 66-10K | |
| capacitors (in mfd) | |
| 33-10 | |
| 40-10 | |
| 49-10 | |
| 50-10 | |
| 53-10 | |
| 55-500 | |
| 60-1 | |

Operation of the FAX-converter-radio assembly shown in FIGS. 1 and 2 will now be described to illustrate how transmission of FAX-to-FAX data is accomplished:

The operator of the FAX transmitting station initiates communication by activating the radio's select call system (not shown) which is programmed to broadcast the radio call sign of the receiving radio station. In response, the receiving station generates a tone to acknowledge receipt of its call sign and, at the same time, a circuit is closed allowing the FAX to receive data. Upon receipt of the tone transmitted by the receiving station, FAX machine 12 of the transmitting station commences sending information copied from its FAX machine which is converted for radio transmission in the form of signal 23. At the same time, FAX signal 22 is sent to amplifier 35 to develop a control signal for operating electronic switches 56 and 58 closing a circuit to ground through the relay coil of PTT 16, and opening the return circuit between receiver 17 and FAX 12.

The receiving FAX machine copies the transmitted information through the third circuit means of converter 10. The signal of the receiver is also fed through the fourth circuit means to the non-inverting input of amplifier 35. This keeps the stronger audio signals from being amplified which would otherwise trigger switches 56 and 58 and open the normally closed contacts of PTT 16.

Although a preferred embodiment of the invention has been illustrated and described, various modifications and changes may be resorted to without departing from the spirit of the invention or the scope of the appended claims and each of such modifications and changes is contemplated.

What is claimed is:

1. An audio-to-radio and radio-to-audio signal converter for interfacing a facsimile machine with a radio transmitter-receiver having a microphone input, an audio output and a push-to-talk relay, said converter comprising:

first circuit means for connecting the output of a facsimile machine to the microphone input of a radio transmitter-receiver;

second circuit means for controlling operation of the push-to-talk relay of the radio transmitter-receiver and comprising a first operational amplifier having inverting and non-inverting inputs and an output, said inverting input being connected to the output of the facsimile machine, an electronic switch connected in series with the push-to-talk relay, and means electrically coupled to the output of said first operational amplifier to operate said electronic switch; whereby the relay contacts are opened by an amplified signal at the output of said first operational amplifier;

third circuit means for receiving and transmitting a message carrying signal from the radio transmitter-receiver to the facsimile machine and to the inverting input of said first operational amplifier; and fourth circuit means for producing a nulling signal in response to an audio output signal from the radio transmitter-receiver and applying the nulling signal to the non-inverting input of said first operational amplifier.

2. The apparatus of claim 1, said second circuit means further comprising:

a second operational amplifier having inverting and non-inverting inputs and an output;

first resistor means coupled between the output of said first operational amplifier and the inverting input of said second operational amplifier; and a variable resistor having a fixed resistance connected between the output of said first operational amplifier and the non-inverting input of said second operational amplifier; whereby a control signal is developed by said variable resistor for controlling the operation of the push-to-talk relay.

3. The apparatus of claim 2, said second circuit means further comprising:
   a third operational amplifier having an output and an inverting input connected to said variable resistor;
   rectifier means coupled to the output of said third operational amplifier for producing a dc control signal; and
   a second electronic switch operated by said dc control signal for operating said first electronic switch.

4. The apparatus of claims 1, 2 or 3, said third circuit means comprises an amplifier having a non-inverting input connected to receive the message carrying signal from said radio transmitter-receiver and an output for transmitting an amplified signal to the facsimile machine.

5. The apparatus of claim 1, said third circuit means comprising an amplifier having a non-inverting input connected to receive the message carrying signal from said radio transmitter-receiver and an output for transmitting an amplified signal to the facsimile machine; said fourth circuit means comprising a variable resistor connected intermediate a power supply and the non-inverting input of said amplifier and including a movable contact connected to the non-inverting input of said first operational amplifier.

6. A method for interfacing a facsimile machine with a radio transmitter-receiver using operational amplifiers, rectifiers and electronic switches, said facsimile machine having an input-output terminal, said transmitter-receiver having a microphone input, an audio output and a push-to-talk relay having normally closed contacts, said method comprising the steps of:
   applying message signals from the facsimile machine through the input-output terminal to the microphone input of the radio transmitter-receiver;
   simultaneously applying said message signals to an operational amplifier having a control input, amplifying said message signals, rectifying the amplified signals and applying the resultant dc control signals to operate the push-to-talk relay and open the normally closed contacts;
   receiving incoming radio signals and forming audio signals at the radio output, applying the audio signals through the normally closed contacts, amplifying the signals passed through the normally closed contacts and applying those signals to the input-output terminal of the facsimile machine;
   and simultaneously applying any audio signals conducted through the normally closed contacts to the control input of the operational amplifier and effectively null the output of the operational amplifier;
   whereby the facsimile machine is interfaced with a radio transmitter-receiver to either transmit or receive radio signals over a common radio channel.

* * * * *